(12) United States Patent
Crawford et al.

(10) Patent No.: US 11,158,210 B2
(45) Date of Patent: Oct. 26, 2021

(54) COGNITIVE REAL-TIME FEEDBACK SPEAKING COACH ON A MOBILE DEVICE

(71) Applicant: INTERNATIONAL BUSINESS MACHINES CORPORATION, Armonk, NY (US)

(72) Inventors: Catherine H. Crawford, Carmel, NY (US); Eleni Pratsini, Zurich (CH); Ramya Raghavendra, White Plains, NY (US); Aisha Walcott, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 15/806,627

(22) Filed: Nov. 8, 2017

(65) Prior Publication Data

US 2019/0139447 A1    May 9, 2019

(51) Int. Cl.
| | | |
|---|---|---|
| *G09B 19/04* | (2006.01) | |
| *G06K 9/00* | (2006.01) | |
| *G10L 25/51* | (2013.01) | |
| *G10L 15/18* | (2013.01) | |
| *G09B 7/04* | (2006.01) | |
| *G06F 40/30* | (2020.01) | |
| *G06F 40/253* | (2020.01) | |
| *G06F 40/279* | (2020.01) | |
| *G10L 15/08* | (2006.01) | |

(52) U.S. Cl.
CPC .......... *G09B 19/04* (2013.01); *G06F 40/253* (2020.01); *G06F 40/279* (2020.01); *G06F 40/30* (2020.01); *G06K 9/00302* (2013.01); *G06K 9/00355* (2013.01); *G09B 7/04* (2013.01); *G10L 15/1807* (2013.01); *G10L 25/51* (2013.01); *G10L 2015/088* (2013.01)

(58) Field of Classification Search
CPC . G09B 19/04; G09B 7/02; G09B 5/06; G06K 9/00885; G06F 17/2785
See application file for complete search history.

(56) References Cited

U.S. PATENT DOCUMENTS

| | | |
|---|---|---|
| 7,715,797 B2 | 5/2010 | Park |
| 8,419,560 B2 | 4/2013 | Amini |
| (Continued) | | |

OTHER PUBLICATIONS

Mell et al., "The NIST Definition of Cloud Computing," National Institute of Standards and Technology, Sep. 2011, p. 1-3, Special Publication 800-145.
Gao et al., "User-centric Speaker Report: Ranking-based Effectiveness Evaluation and Feedback", 2009 IEEE 12th International Conference on Computer Vision Workshops, ICCV Workshops, Sep. 27-Oct. 4, 2009, Kyoto, Japan, p. 1004-1011.

(Continued)

*Primary Examiner* — Peter R Egloff
(74) *Attorney, Agent, or Firm* — Michael O'Keefe

(57) ABSTRACT

A method, computer system, and computer program product for a cognitive, real-time feedback speaking coach are provided. The embodiment may include capturing a plurality of text from a prepared document. The embodiment may also include capturing a plurality of user voice data and a plurality of user movement data. The embodiment may further include calculating a speaker rating based on the plurality of received user voice data, the plurality of received user movement data, and the plurality of captured text. The embodiment may also include identifying one or more points of improvement based on the calculated speaker rating. The embodiment may further include alerting a user of the one or more identified points of improvement.

17 Claims, 5 Drawing Sheets

(56) References Cited

U.S. PATENT DOCUMENTS

| | | | |
|---|---|---|---|
| 8,589,167 | B2 | 11/2013 | Baughman et al. |
| 9,042,867 | B2 | 5/2015 | Gomar |
| 9,185,492 | B2 | 11/2015 | Afshar |
| 9,197,971 | B2 | 11/2015 | Michael et al. |
| 9,232,071 | B2 | 1/2016 | Visser et al. |
| 9,344,821 | B2 | 5/2016 | Emery et al. |
| 9,542,948 | B2 | 1/2017 | Roblek et al. |
| 9,554,405 | B2 | 1/2017 | Weel |
| 10,403,050 | B1* | 9/2019 | Beall .................. G06T 7/292 |
| 2008/0214944 | A1 | 9/2008 | Morris et al. |
| 2014/0356822 | A1* | 12/2014 | Hoque .............. G09B 19/04 434/185 |
| 2015/0269857 | A1* | 9/2015 | Feng ................ G10L 25/00 434/353 |
| 2016/0049094 | A1* | 2/2016 | Gupta ............... G09B 19/04 434/185 |
| 2016/0336022 | A1 | 11/2016 | Florencio et al. |
| 2017/0316091 | A1* | 11/2017 | Edge ................ G06F 40/151 |

OTHER PUBLICATIONS

Idea Connection, "Rhema App Improves Public Speaking", https://www.ideaconnection.com/new-inventions/rhema-app-improves-public-speaking-09489.html, Apr. 23, 2015, p. 1-3.

Say It Like So, "LikeSo: Your Personal Speech Coach", https://sayitlikeso.com/, accessed on Oct. 4, 2017, p. 1-6.

Schneider et al., "Presentation Trainer, your Public Speaking Multimodal Coach", Proceedings of the 2015 ACM on International Conference on Multimodal Interaction, (ICMI '15), Nov. 9-13, 2015, Seattle, WA, USA, p. 539-546.

Tanveer et al., "Rhema: A Real-Time In-Situ Intelligent Interface to Help People with Public Speaking", Proceedings of the 20th International Conference on Intelligent User Interfaces, (IUI 2015), Mar. 29-Apr. 1, 2015, Atlanta, GA, USA, p. 286-295.

Ummo, "Your Personalized Speech Coach", Speech Coaching App, http://www.ummoapp.com/, accessed on Oct. 4, 2017, p. 1-9.

\* cited by examiner

COGNITIVE REAL-TIME FEEDBACK SPEAKING COACH ON A MOBILE DEVICE

BACKGROUND

The present invention relates, generally, to the field of computing, and more particularly to natural language processing.

Natural language processing may relate to a field within computer science dealing with the analysis of natural language by a computer. Natural language processing may have applications in various categories, such as syntax, semantics, discourse, and speech. Various applications within the mentioned categories include text-to-speech, speech-to-text, machine translation, lexical semantics, named entity recognition, optical character recognition, relationship extraction, topic segmentation, word sense disambiguation, automatic summarization, coreference resolution, discourse analysis, speech recognition, and speech segmentation.

SUMMARY

According to one embodiment, a method, computer system, and computer program product for a cognitive, real-time feedback speaking coach are provided. The embodiment may include capturing a plurality of text from a prepared document. The embodiment may also include capturing a plurality of user voice data and a plurality of user movement data. The embodiment may further include calculating a speaker rating based on the plurality of received user voice data, the plurality of received user movement data, and the plurality of captured text. The embodiment may also include identifying one or more points of improvement based on the calculated speaker rating. The embodiment may further include alerting a user of the one or more identified points of improvement.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
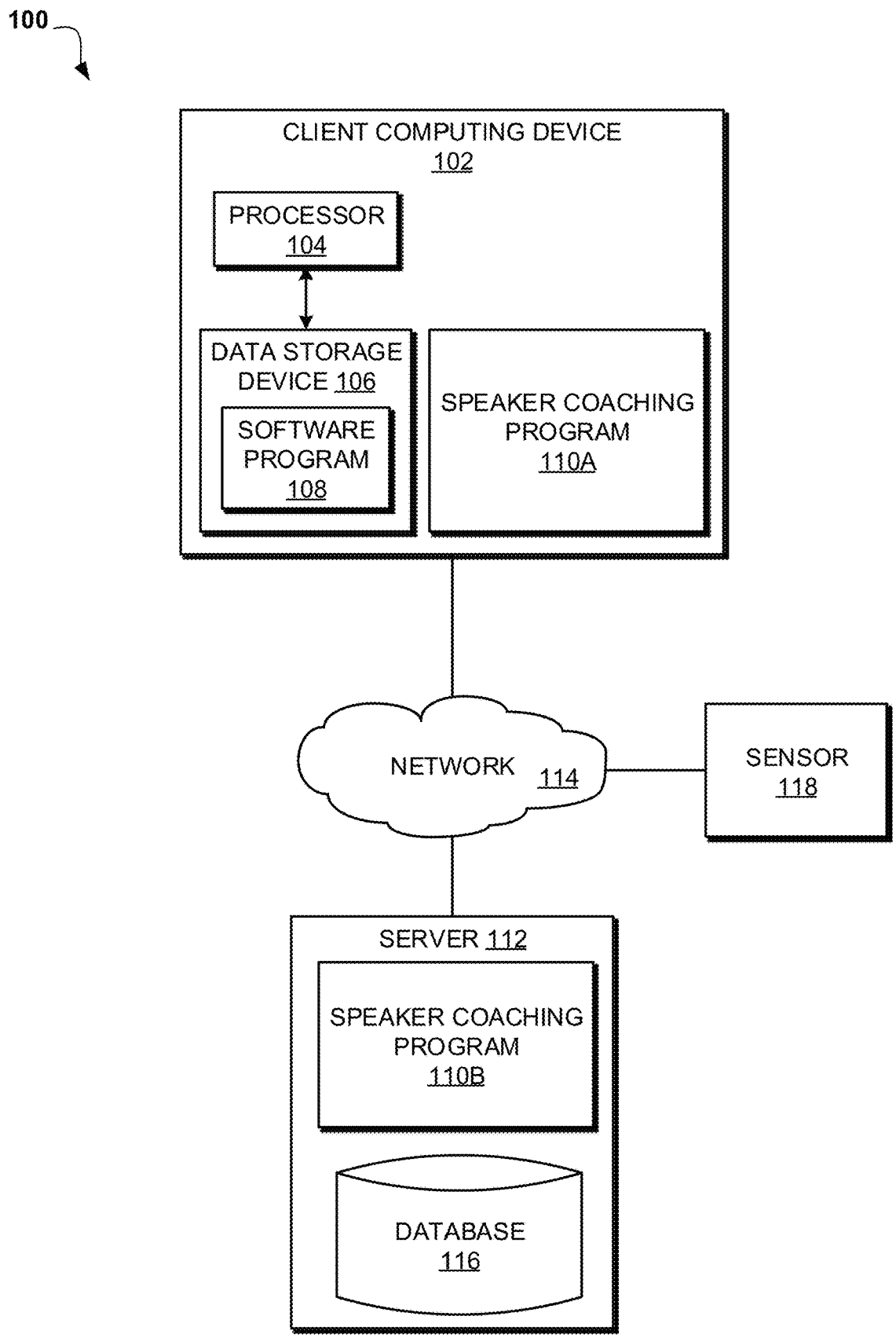
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to natural language processing. The following described exemplary embodiments provide a system, method, and program product to, among other things, leverage mobile device computing power to classify speaker behaviors across all speaker modalities on live streams of data Therefore, the present embodiment has the capacity to improve the technical field of natural language processing by incorporating multiple modalities of data into a single analysis stream, performing analysis on a mobile device rather than transmitting data to the cloud for analysis, and providing real time feedback to a user through various available haptic sensors.

As previously described, natural language processing may relate to a field within computer science dealing with the analysis of natural language by a computer. Natural language processing may have applications in various categories, such as syntax, semantics, discourse, and speech. Various applications within the mentioned categories include text-to-speech, speech-to-text, machine translation, lexical semantics, named entity recognition, optical character recognition, relationship extraction, topic segmentation, word sense disambiguation, automatic summarization, coreference resolution, discourse analysis, speech recognition, and speech segmentation.

An individual that speaks in front of other individuals may be most effective at conveying a message when the right combination of visual, body, and audio cues are utilized. For example, a speaker that limits dead words (e.g., "um", "ah", or "so") and uses well-placed and open hand gestures, planned/deliberate stage movements, changing of vocal features (e.g., tone, pitch, and volume) for emphasis, spacing of words, or a combination of each of these elements may provide a lasting, positive impression to listeners. Some technologies may exist that allow a speaker to receive coaching of a recorded speech to later improve the speaker's presentation skills. However, many current systems for coaching speakers require constant connection of a user device to a cloud network to provide analysis of the recorded presentation. Furthermore, any analysis of a recorded presentation is post event coaching and will not help a speaker improve speaking abilities during an in-progress presentation. Additionally, many typical coaching technologies place a focus only on speech and do not classify hand or body movements that result in effective speaking skills. As such, it may be advantageous to, among other things, analyze user movements and voice features in comparison to a prepared presentation to rate the quality of a user's speaking proficiency.

According to one embodiment, effective and ineffective speaking behaviors may be classified across various speaker modalities, such as vocal features and user movements. The speaking behaviors may be captured using sensors, such as a microphone to capture a user's voice and haptic sensors or an image capture device to obtain user movements. The user speaking behaviors may be analyzed through detection of known positive and negative speaking behaviors and characteristics, such as the presence of dead words, use of hand gestures, and proper spacing of words. The user behaviors may be classified as effective or ineffective based on the analysis and one or more points of improvement may be presented to the user to enhance user speaking abilities.

Additionally, the classifiers may be trained in a cloud environment or on a user device based on user personalization or privacy requirements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze captured user speech and behaviors exhibited during a presentation and provide points of improvement to the user to improve overall user speaking ability of the presentation.

Referring to FIG. 1, an exemplary networked computer environment 100 is depicted, according to at least one embodiment. The networked computer environment 100 may include client computing device 102, a server 112, and a sensor 118 interconnected via a communication network 114. According to at least one implementation, the networked computer environment 100 may include a plurality of client computing devices 102, servers 112, and sensors 118, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a speaker coaching program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a speaker coaching program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, sensor 118 may be a wearable technology device capable of recording user movement data, such as hand gestures, facial gestures, arm movement, and body position, through embedded technology, such as a gyroscope or an accelerometer. In at least one embodiment, the sensor 118 may be capable of capturing biometric data, such as heartbeat and temperature, through embedded technology, such as a thermometer, or a heart rate monitor. In another embodiment, the sensor 118 may be capable of capturing images or videos to aid in the capturing of user movements, such as facial expressions, through motion capture technology or to aid in the input and analysis of a speaker presentation through image recognition and optical character recognition. The sensor 118 may include a processor, similar to processor 104 in client computing device 102, capable of communicating with the client computing device 102 and the server 112 through the network 114.

The speaker coaching program 110A, 110B may be a program capable of receiving captured user data, such as voice data and movement data, to further analyze for effective and ineffective speaker behaviors. The speaker coaching program 110A, 110B may also be capable of generating one or more points of improvement to the user's speaking behaviors to present to the user. The speaker coaching method is explained in further detail below with respect to FIG. 2.

Figure 2:
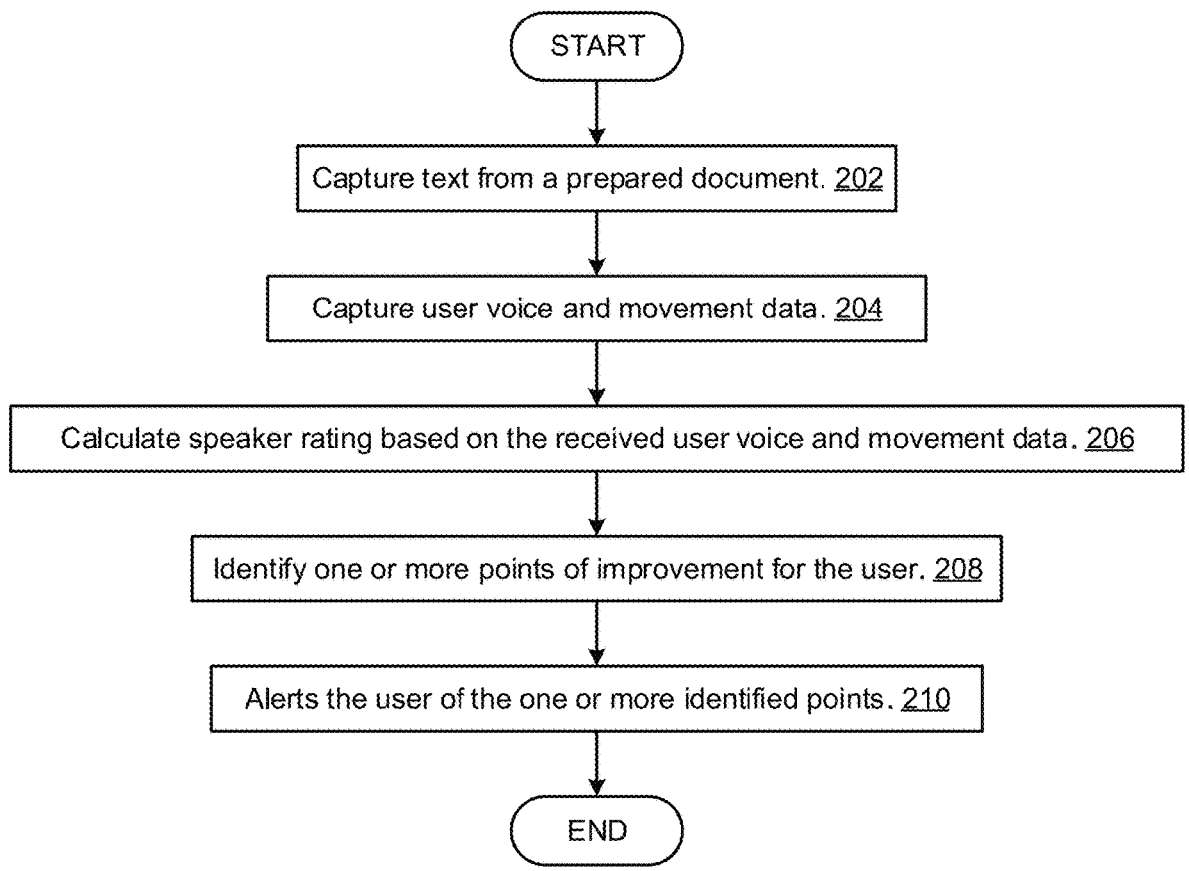
FIG. 2 is an operational flowchart illustrating a speaker coaching process according to at least one embodiment.

FIG. 2 is an operational flowchart illustrating a speaker coaching process 200 according to at least one embodiment. At 202, the speaker coaching program 110A, 110B captures text from a prepared document. In order to properly analyze a user's speaking quality while performing a presentation, the speaker coaching program 110A, 110B capture a prepared document from which the user will present. For example, speaker coaching program 110A, 110B may capture a picture of a user's presentation outline or a script from which the user will read during a presentation. The speaker coaching program 110A, 110B may capture the prepared document using an image capture device, such as a camera, that may be connected to client computing device 102 externally or internally. The speaker coaching program 110A, 110B may analyze the prepared document using known natural language processing techniques, such as optical character recognition and semantic analysis.

Additionally, the speaker coaching program 110A, 110B may capture images present on the prepared documents. For example, if a prepared document is a deck of slides with a graph depicted on a slide, the speaker coaching program 110A, 110B may use image recognition technology to identify and analyze the graph.

Then, at 204, the speaker coaching program 110A, 110B captures user voice, user facial expression data, and movement data. During the practice or performance of a presentation, a user giving a presentation may engage in various body movements, facial expressions, and vocal patterns that may require analysis to full rate the quality of the user's performance effectiveness. To be capable of capturing user voice data, facial expression data, and movement data, the speaker coaching program 110A, 110B may utilize one or more sensors 118. The one or more sensors 118 may be haptic sensors used to capture user motions. For example, a user may have a series of sensors 118 placed around the user's body (e.g., hands, arms, head, and legs) to assist the speaker coaching program 110A, 110B in capturing movement data. The one or more sensors 118 may also be a camera capable of capture user facial expressions. With respect to capturing a user's voice data, the speaker coaching program 110A, 110B may utilize a sensor 118 capable of recording sounds, such as a microphone. The sound-capturing sensor 118 may be internally connected to the client computing device 102 or externally connected to either the client computing device 102 or server 112 via the network 114. Upon capturing the voice data and movement data, the one or more sensors 118 may transmit the captured data to the speaker coaching program 110A, 110B for analysis.

Next, at 206, the speaker coaching program 110A, 110B calculates a speaker rating based on the received user voice, facial expression data, and movement data. Upon receiving the speaker voice data, facial expression data, and movement data, the speaker coaching program 110A, 110B may analyze the received voice data, using semantic analysis, and movement data to calculate a speaker rating in various categories. Furthermore, the facial expression data may be analyzed using facial sentiment analysis to determine a user's emotion or sentiment when speaking. The speaker rating may represent audience reactions and feedback from a current presentation or a previous presentation The speaker rating may be either a categorical (e.g., high, medium, low) or a numerical value used to rate a user's performance in one or more categories (e.g., hand gestures, dead word usage, spacing of words, vocal tone, vocal pitch, speaking pace, body movements, volume used for emphasis, and word diction). For example, the speaker coaching program 110A, 110B may analyze the movement data to determine that the user's hands are kept in the user's pockets during the presentation rather than performing well-placed, open hand gestures. Therefore, the speaker coaching program 110A, 110B may calculate a low rating for the user's hand gestures. Similarly, the received voice data may indicate that the user uses very few dead words (e.g., "um" or "ah"), which may result in the speaker coaching program 110A, 110B calculating a favorable rating for the user's dead word usage.

Then, at 208, the speaker coaching program 110A, 110B identifies one or more points of improvement for the user. Based on the speaker rating for each category, the speaker coaching program 110A, 110B may identify one or more points of improvement for the user and generate a report detailing each point. The identification of each point of improvement may be based on the calculated speaker rating satisfying or not satisfying a threshold. For example, if too many dead words are used in a user's practice presentation that a dead word threshold is satisfied, the speaker coaching program 110A, 110B may identify the dead word usage category as a point of improvement for the user. Conversely, if the speaker coaching program 110A, 110B determines the speaker rating for the hand gesture usage category satisfies a hand gesture threshold, the speaker coaching program 110A, 110B may determine that the user sufficiently utilizes hand gestures and the hand gesture usage category should not be identified as a point of improvement for the user.

In at least one embodiment, the speaker coaching program 110A, 110B may generate a report that includes one or more points for improvement of speaker presentation. For example, if the speaker coaching program 110A, 110B determines the user utilizes too many dead words based on the speaker rating for the dead word use category, the speaker coaching program 110A, 110B may include the user's dead word usage in the generated report. The generated report may be a written or typed document that lists each point of improvement to the user, such as a bulleted word processing document or a spreadsheet table.

In another embodiment, the speaker coaching program 110A, 110B may store the generated report in a repository, such as database 116, for implementation in subsequent practice presentation sessions to provide real time feedback to the user. For example, the speaker coaching program 110A, 110B may use a previously stored report with a listed point of improvement to use more hand gestures to issue a vibration alert to a sensor worn by the user when the user when insufficient hand gestures are made during a subsequent practice presentation.

Next, at 210, the speaker coaching program 110A, 110B alerts the user of the one or more identified points. The speaker coaching program 110A, 110B may indicate to the user in real time that the user's action are ineffective by issuing an alert, such as a vibration or an audible tone, to the user when a poor action is detected by the one or more sensors 118. For example, if the user is not using adequate hand gestures, the speaker coaching program 110A, 110B may alert the user to make more hand gestures by vibrating a mobile device or a sensor 118 worn by the speaker. Similarly, if the speaker coaching program 110A, 110B determines the user is using too many dead words during a practice presentation, the speaker coaching program 110A, 110B may execute a sound clip to play on a speaker on the client computing device 102 that notifies the user of the excessive dead word usage.

In at least one embodiment, if the speaker coaching program 110A, 110B generated a report listing each point of improvement for the user, the speaker coaching program 110A, 110B may alert the user of the generated report by displaying the generated report on a graphical user interface of the client computing device 102. In at least one other embodiment, the speaker coaching program 110A, 110B may transmit the generated report to the user. For example, upon generation of the report, the speaker coaching program 110A, 110B may transmit the generated report to the user via email or short message service (SMS).

It may be appreciated that FIG. 2 provides only an illustration of one implementation and does not imply any limitations with regard to how different embodiments may be implemented. Many modifications to the depicted environments may be made based on design and implementation requirements.

Figure 3:
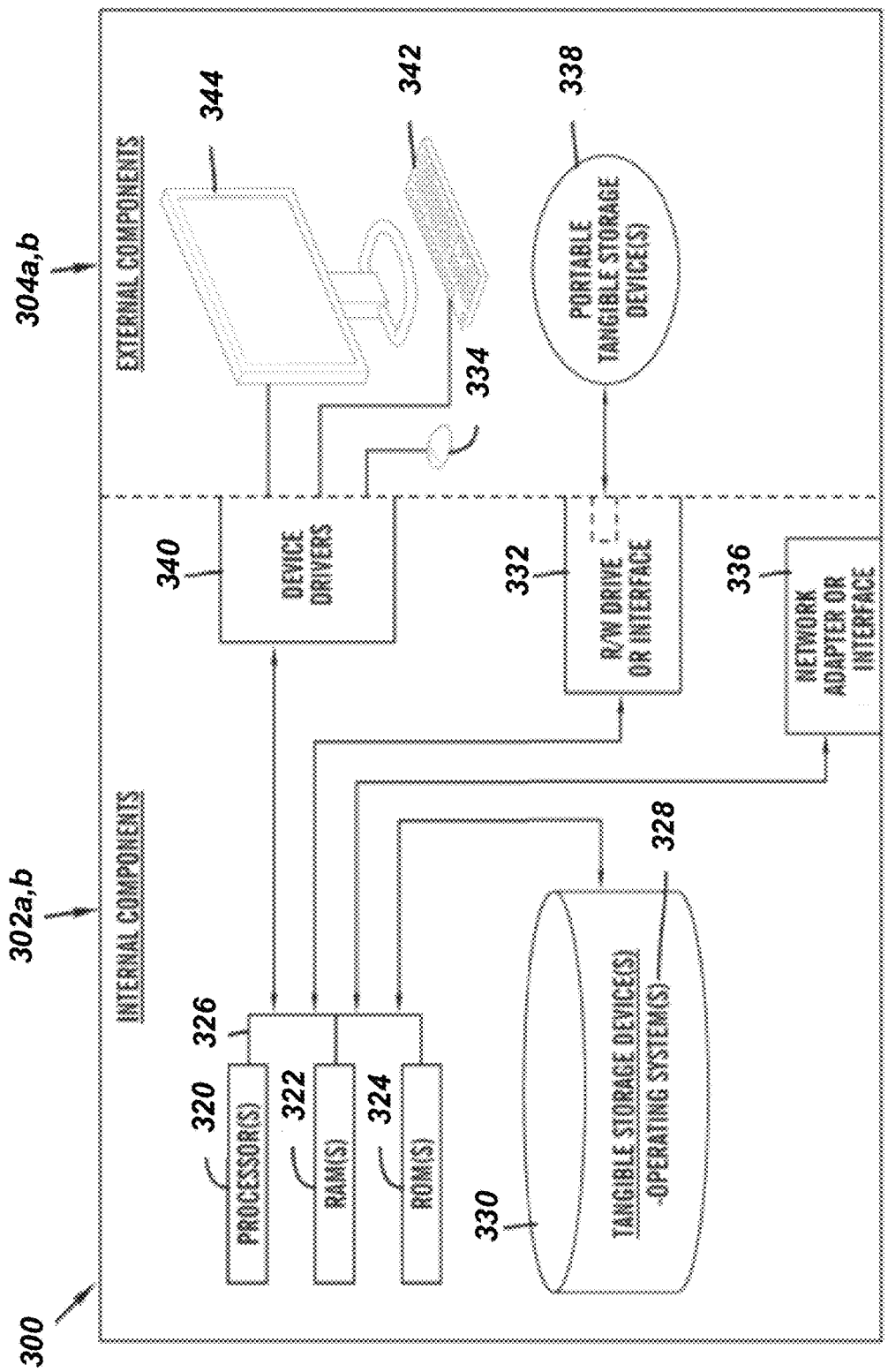
FIG. 3 is a block diagram of internal and external components of computers and servers depicted in FIG. 1 according to at least one embodiment.
Figure 4:
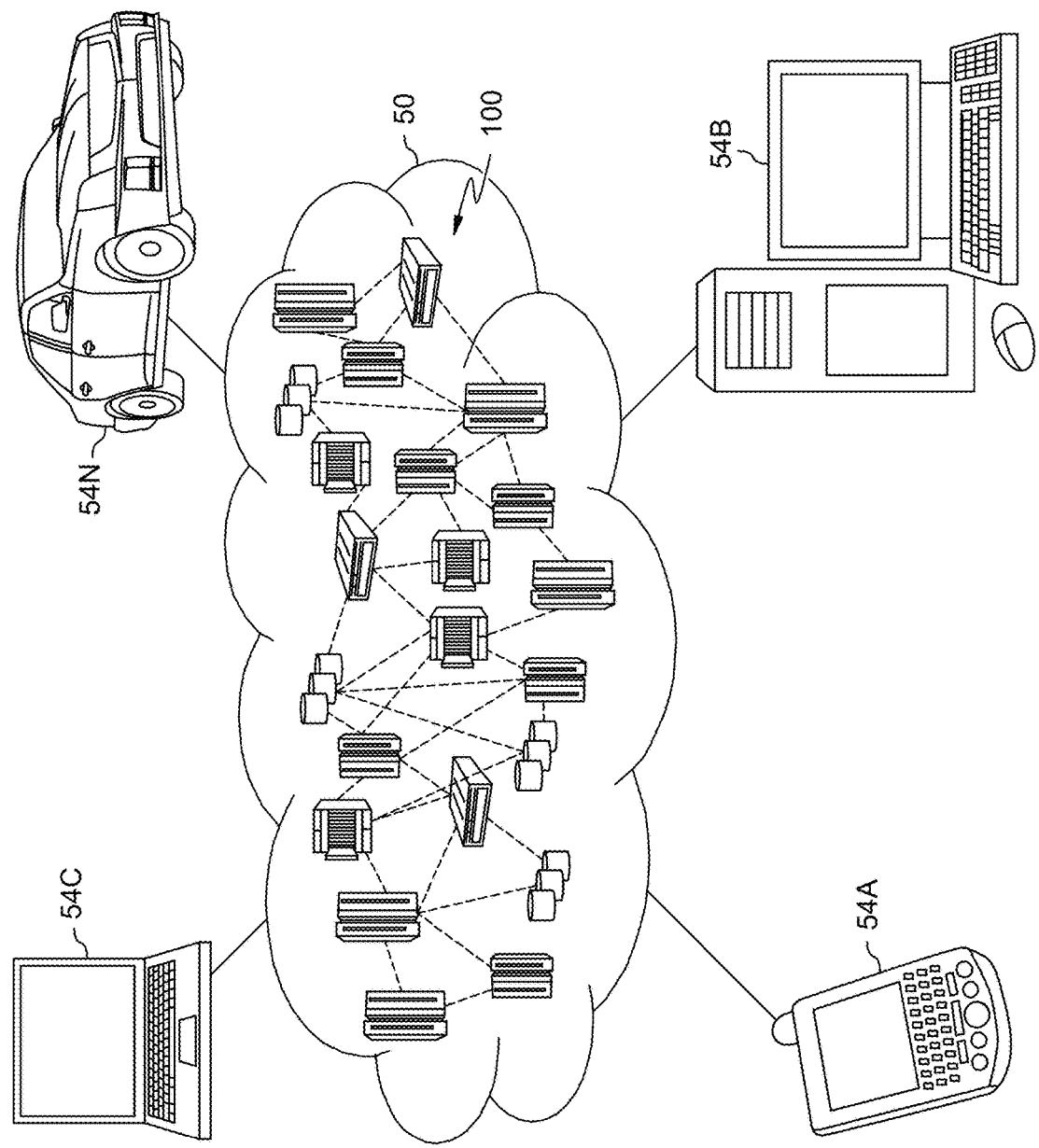
FIG. 4 depicts a cloud computing environment according to an embodiment of the present invention.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the speaker coaching program 110A in the client computing device 102 and the speaker coaching program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the speaker coaching program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 and the speaker coaching program 110A in the client computing device 102 and the speaker coaching program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the speaker coaching program 110A in the client computing device 102 and the speaker coaching program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
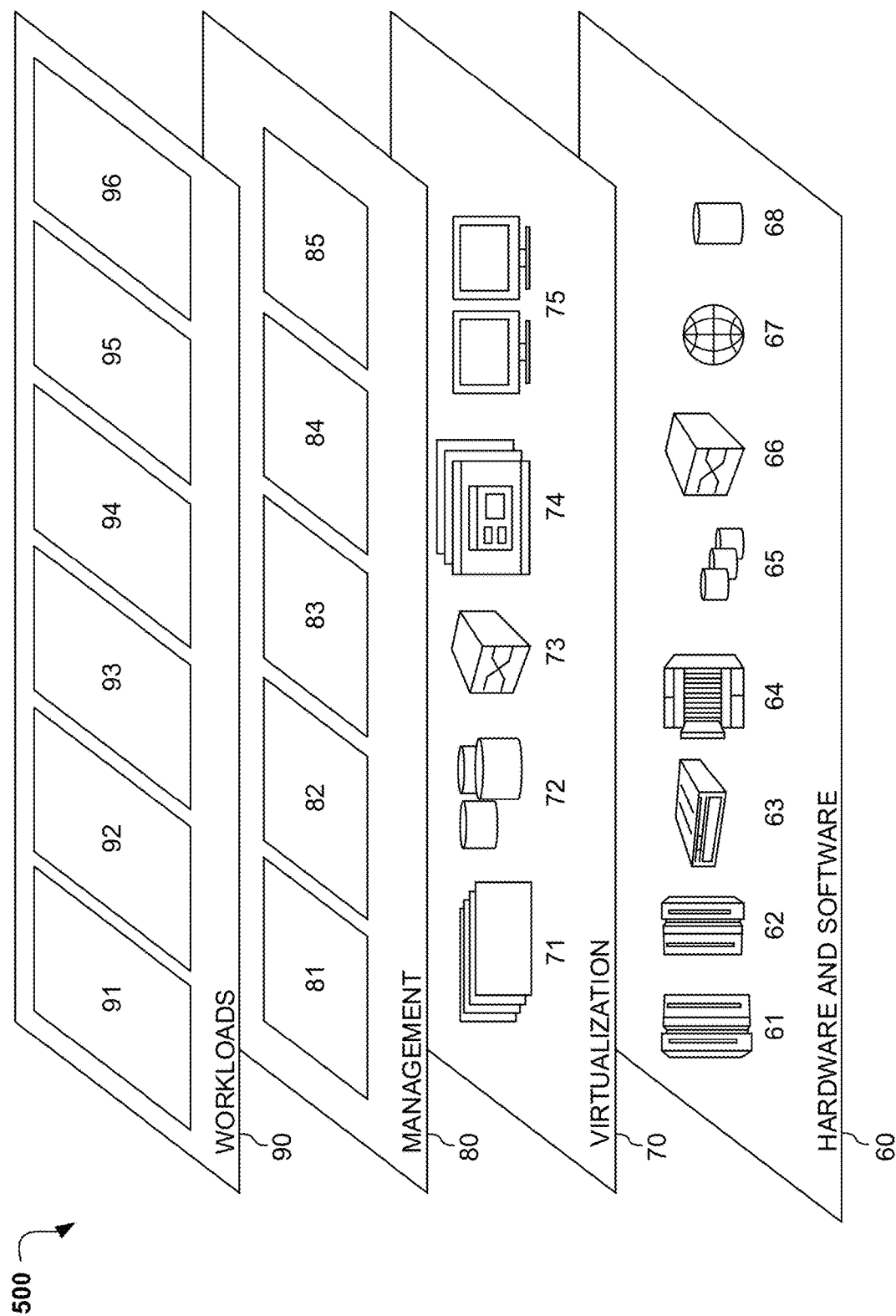
FIG. 5 depicts abstraction model layers according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and speaker coaching 96. Speaker coaching 96 may relate to analyzing captured user voice and movement data to identify effective and ineffective user behaviors that can be used to generate and present to the user one or more points of improvement intended to increase the user's speaking ability.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for a cognitive, real-time feedback speaking coach, the method comprising:
    capturing, by a processor associated with a user device, a plurality of text and a plurality of images from a prepared presentation document;
    capturing a plurality of user voice data, a plurality of user facial expression data, and a plurality of user movement data, wherein the plurality of user movement data is captured through a plurality of haptic sensors affixed to a plurality of user appendages communicatively coupled to transmit appendage positional data within time and space to the user device, wherein the plurality of appendages comprise a hand, an arm, a leg, and a head;
    calculating a speaker rating in each of a plurality of categories, in real-time and concurrently on the user device, during a live presentation of the prepared presentation document, based on the plurality of received user voice data, the plurality of received user movement data, the plurality of captured user facial expression data, the plurality of captured text and the plurality of captured images from the prepared presentation document, wherein the plurality of categories comprises a category for each of hand gestures, dead word usage, spacing of words, vocal tone, vocal pitch, body movements, volume used for emphasis, and word diction, and wherein a category within the plurality of categories is user sentiment calculated by the plurality of received user voice data and the plurality of captured user facial expression data;
    identifying one or more points of improvement based on the calculated speaker ratings; and
    alerting a user of the one or more identified points of improvement during the live presentation.

2. The method of claim 1, further comprises:
    capturing one or more images displayed within the prepared document; and analyzing the one or more captured images using image recognition technology.

3. The method of claim 1, further comprising:
analyzing the plurality of captured text using one or more natural language processing techniques and one or more facial expressions using one or more facial sentiment analysis techniques.

4. The method of claim 1, wherein the speaker rating is a categorical value or a numerical value assigned to a plurality of categories and is defined by one or more audience reactions and a plurality of feedback from a current or a previous presentation.

5. The method of claim 1, further comprising:
generating a report that includes the one or more identified points of improvement; and
displaying the generated report to the user on a graphical user interface.

6. The method of claim 3, wherein the one or more natural language processing techniques are selected from a group consisting of optical character recognition and semantic analysis.

7. A computer system for a cognitive, real-time feedback speaking coach, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
capturing, by a processor associated with a user device, a plurality of text and a plurality of images from a prepared presentation document;
capturing a plurality of user voice data, a plurality of user facial expression data, user biometric data, and a plurality of user movement data, wherein the plurality of user movement data is captured through a plurality of haptic sensors affixed to a plurality of user appendages communicatively coupled to transmit appendage positional data within time and space to the user device, wherein the plurality of appendages comprise a hand, an arm, a leg, and a head;
calculating a speaker rating in each of a plurality of categories, in real-time and concurrently on the user device, during a live presentation of the prepared presentation document, based on the plurality of received user voice data, the plurality of received user movement data, the plurality of captured user facial expression data, and the plurality of captured text and the plurality of captured images from the prepared presentation document, wherein the plurality of categories comprises a category for each of hand gestures, dead word usage, spacing of words, vocal tone, vocal pitch, body movements, volume used for emphasis, and word diction, and wherein a category within the plurality of categories is user sentiment calculated by the plurality of received user voice data and the plurality of captured user facial expression data;
identifying one or more points of improvement based on the calculated speaker ratings; and
alerting a user of the one or more identified points of improvement during the live presentation.

8. The computer system of claim 7, further comprises:
capturing one or more images displayed within the prepared document; and
analyzing the one or more captured images using image recognition technology.

9. The computer system of claim 7, further comprising:
analyzing the plurality of captured text using one or more natural language processing techniques and one or more facial expressions using one or more facial sentiment analysis techniques.

10. The computer system of claim 7, wherein the speaker rating is a categorical value or a numerical value assigned to a plurality of categories and is defined by one or more audience reactions and a plurality of feedback from a current or a previous presentation.

11. The computer system of claim 7, further comprising:
generating a report that includes the one or more identified points of improvement; and
displaying the generated report to the user on a graphical user interface.

12. The computer system of claim 9, wherein the one or more natural language processing techniques are selected from a group consisting of optical character recognition and semantic analysis.

13. A computer program product for a cognitive, real-time feedback speaking coach, the computer program product comprising:
one or more computer-readable tangible storage media and program instructions stored on at least one of the one or more tangible storage media, the program instructions executable by a processor of a computer to perform a method, the method comprising:
capturing, by a processor associated with a user device, a plurality of text and a plurality of images from a prepared presentation document;
capturing a plurality of user voice data, a plurality of user facial expression data, user biometric data, and a plurality of user movement data, wherein the plurality of user movement data is captured through a plurality of haptic sensors affixed to a plurality of user appendages communicatively coupled to transmit appendage positional data within time and space to the user device, wherein the plurality of appendages comprise a hand, an arm, a leg, and a head;
calculating a speaker rating in each of a plurality of categories, in real-time and concurrently on the user device, during a live presentation of the prepared presentation document, based on the plurality of received user voice data, the plurality of received user movement data, the plurality of captured user facial expression data, and the plurality of captured text and the plurality of captured images from the prepared presentation document, wherein the plurality of categories comprises a category for each of hand gestures, dead word usage, spacing of words, vocal tone, vocal pitch, body movements, volume used for emphasis, and word diction, and wherein a category within the plurality of categories is user sentiment calculated by the plurality of received user voice data and the plurality of captured user facial expression data;
identifying one or more points of improvement based on the calculated speaker ratings; and
alerting a user of the one or more identified points of improvement during the live presentation.

14. The computer program product of claim 13, further comprises:
capturing one or more images displayed within the prepared document; and
analyzing the one or more captured images using image recognition technology.

15. The computer program product of claim 13, further comprising:
- analyzing the plurality of captured text using one or more natural language processing techniques and one or more facial expressions using one or more facial sentiment analysis techniques.

16. The computer program product of claim 13, wherein the speaker rating is a categorical value or a numerical value assigned to a plurality of categories and is defined by one or more audience reactions and a plurality of feedback from a current or a previous presentation.

17. The computer program product of claim 13, further comprising:
- generating a report that includes the one or more identified points of improvement; and
- displaying the generated report to the user on a graphical user interface.

\* \* \* \* \*